United States Patent
Kolor et al.

(10) Patent No.: US 12,463,920 B2
(45) Date of Patent: Nov. 4, 2025

(54) SEGMENT TO SEGMENT NETWORK INTERFACE

(71) Applicant: Apple Inc., Cupertino, CA (US)

(72) Inventors: Sergio Kolor, Haifa (IL); Lior Zimet, Haifa (IL); Opher D. Kahn, Zichron Yacov (IL); Eran Tamari, Herzeliya Pituach (IL); Tzach Zemer, Haifa (IL); Per H. Hammarlund, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 655 days.

(21) Appl. No.: 17/868,495

(22) Filed: Jul. 19, 2022

(65) Prior Publication Data

US 2023/0239252 A1 Jul. 27, 2023

Related U.S. Application Data

(60) Provisional application No. 63/302,347, filed on Jan. 24, 2022.

(51) Int. Cl.
*H04L 49/25* (2022.01)
*H04L 47/10* (2022.01)

(52) U.S. Cl.
CPC .............. *H04L 49/25* (2013.01); *H04L 47/39* (2013.01)

(58) Field of Classification Search
CPC ................................ H04L 49/25; H04L 47/39
USPC ........................................................ 370/355
See application file for complete search history.

(56) References Cited

U.S. PATENT DOCUMENTS

| | | |
|---|---|---|
| 7,098,541 B2 | 8/2006 | Adelmann |
| 7,340,548 B2 | 3/2008 | Love |
| 8,190,855 B1 | 5/2012 | Ramey et al. |
| 8,374,175 B2 | 2/2013 | Riley |
| 8,670,261 B2 | 3/2014 | Crisp et al. |
| 8,786,069 B1 | 7/2014 | Haba et al. |
| 9,029,234 B2 | 5/2015 | Safran et al. |
| 9,244,874 B2 | 1/2016 | Hearn et al. |
| 10,153,006 B2 | 12/2018 | Hamada |
| 10,491,462 B1 | 11/2019 | Wagner et al. |
| 10,523,585 B2 | 12/2019 | Davis et al. |
| 10,673,439 B1 | 6/2020 | Ahmad et al. |
| 10,693,783 B2 | 6/2020 | Agarwal et al. |
| 10,733,350 B1 | 8/2020 | Prasad et al. |
| 11,016,810 B1 | 5/2021 | Parikh et al. |

(Continued)

FOREIGN PATENT DOCUMENTS

| | | |
|---|---|---|
| WO | 2014185917 A1 | 11/2014 |
| WO | 2017112198 A1 | 6/2017 |

OTHER PUBLICATIONS

U.S. Appl. No. 17/337,805, filed Jun. 3, 2022.

(Continued)

*Primary Examiner* — Faisal Choudhury
(74) *Attorney, Agent, or Firm* — Kowert, Hood, Munyon, Rankin & Goetzel, P.C.

(57) ABSTRACT

In an embodiment, a system includes a plurality of integrated circuits have subsets of a plurality of agents. The plurality of integrated circuits may have network segments implemented wholly (e.g., entirely) within the respective integrated circuits and may have segment to segment (S2S) network interface circuits to couple to other network segments of a plurality of network segment forming a network among the plurality of agents.

20 Claims, 9 Drawing Sheets

(56) References Cited

U.S. PATENT DOCUMENTS

| | | |
|---|---|---|
| 11,818,799 B1* | 11/2023 | Chu .................. H04W 80/02 |
| 2004/0078709 A1* | 4/2004 | Beukema ............... H04L 43/50 |
| | | 714/E11.171 |
| 2005/0138260 A1 | 6/2005 | Love |
| 2005/0195835 A1 | 9/2005 | Savage et al. |
| 2009/0305463 A1 | 12/2009 | Bartley et al. |
| 2014/0201500 A1 | 7/2014 | Niell et al. |
| 2014/0301241 A1 | 10/2014 | Kumar et al. |
| 2015/0036536 A1 | 2/2015 | Kumar et al. |
| 2015/0331826 A1 | 11/2015 | Ghosh et al. |
| 2015/0341224 A1 | 11/2015 | van Ruymbeke et al. |
| 2016/0378701 A1 | 12/2016 | Niell et al. |
| 2017/0220499 A1 | 8/2017 | Gray |
| 2018/0218105 A1 | 8/2018 | de Lescure |
| 2018/0285290 A1 | 10/2018 | Luan et al. |
| 2019/0205493 A1 | 7/2019 | Garibay et al. |
| 2019/0340314 A1 | 11/2019 | Boesch et al. |
| 2019/0361770 A1 | 11/2019 | Geng et al. |
| 2019/0378238 A1 | 12/2019 | Ramadoss et al. |
| 2020/0074713 A1 | 3/2020 | Schuluessler et al. |
| 2020/0151005 A1 | 5/2020 | Park et al. |
| 2020/0153757 A1 | 5/2020 | Bharadwaj et al. |
| 2020/0404680 A1* | 12/2020 | Chu .................. H04W 72/0453 |
| 2021/0255947 A1 | 8/2021 | Koker et al. |

OTHER PUBLICATIONS

U.S. Appl. No. 17/194,003, filed Mar. 5, 2021.
U.S. Appl. No. 17/337,805, filed Jun. 3, 2021.
International Search Report and Written Opinion in PCT Appl. No. PCT/US2023/011277 mailed May 12, 2023, 9 pages.
Hansson et al., "An On-Chip Interconnect and Protocol Stack for Multiple Communication Paradigms and Programming Models", Harware/Software Codesign and System Synthesis Conference, Grenoble, France, Oct. 11-16, 2009, 10 pages.
Office Action in U.S. Appl. No. 17/337,805 mailed Sep. 6, 2022, 8 pages.

* cited by examiner

Computer Accessible Storage Medium 800

SOC 804

FIG. 9

SEGMENT TO SEGMENT NETWORK INTERFACE

This application claims benefit or priority to U.S. Provisional Patent Application Ser. No. 63/302,347, filed on Jan. 24, 2022. The above application is incorporated herein by reference in its entirety. To the extent that anything in the provisional application conflicts with material expressly set forth herein, the expressly set forth material controls.

BRIEF DESCRIPTION OF THE DRAWINGS

The following detailed description refers to the accompanying drawings, which are now briefly described.

FIG. 9 is a block diagram of one embodiment of a computer accessible storage medium.

Figure 1:
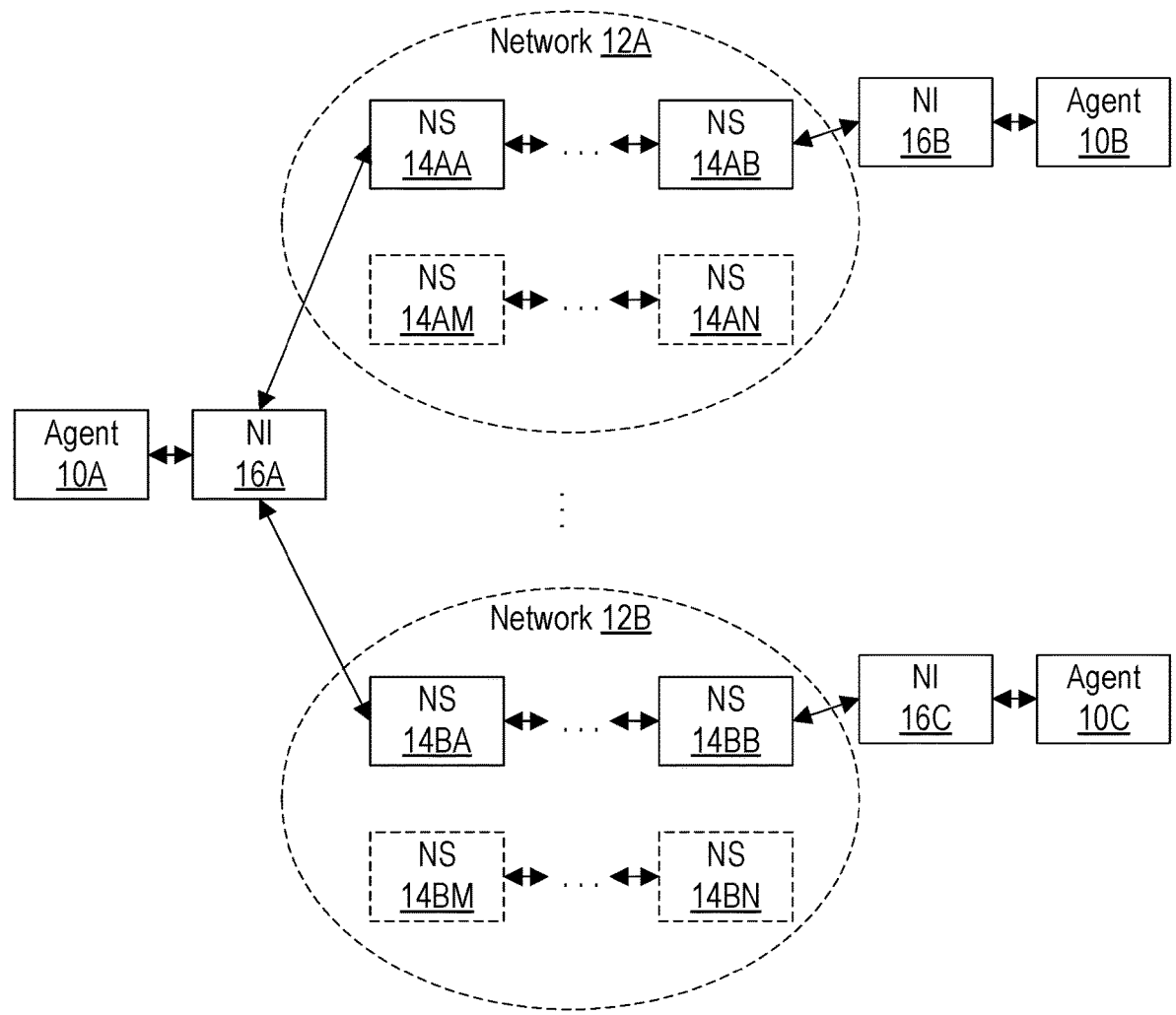
FIG. 1 is a block diagram of a system including one embodiment of multiple networks interconnecting agents.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description.

DETAILED DESCRIPTION OF EMBODIMENTS

In an embodiment, a system may include multiple integrated circuits coupled via one or more networks. Each integrated circuit may be formed on a single semiconductor substrate or "chip," separate from the substrates/chips on which the other integrated circuits may be formed. The integrated circuits may incorporate a plurality of agent circuits (more briefly, "agents"), which may be the sources and targets of packets on the one or more networks. Because the networks span multiple integrated circuits, and the agents are implemented across those integrated circuits, the resources employed within the network to manage the packet flow may be significant and thus costly to implement, e.g., in terms of circuit area and/or power consumption.

In an embodiment, a given network may be segmented into multiple network segments. A given packet may be transmitted by a source agent onto the network segment to which the source agent is coupled. The network segment may include a fabric circuit to transport packets within the segment. Any topology and fabric transmission mechanism may be used. As an example herein, a switched fabric circuit/network is used but any other fabric circuit may be used in other embodiments, and different segments may employ different mechanisms. A segment to segment (S2S) network interface circuit may also be coupled to the segment. Packets which have a target destination agent on a different network segment may be transmitted to the S2S network interface circuit. From the perspective of the source agent for packet transmission, the S2S network interface circuit may be the target destination even though the packet is ultimately targeted at a destination agent on another network. That is, the source agent's participation in transmitting the packet may be complete based on receipt of the packet at the S2S network interface circuit. It may then become the S2S network interface circuit's responsibility to forward the packet onto another network segment to the destination agent (or to another S2S network interface circuit, which may then take responsibility for forwarding the packet to yet another network segment), until the packet arrives on the network segment to which the destination agent is coupled.

Accordingly, the resources employed by the S2S network interface circuits in the system, as well as in the switched fabric within each network segment that routes packets within the network segment, may be reduced compared to an unsegmented network. For example, in an embodiment, various network interface circuits that are part of the switched fabric may employ packet storage locations, and may divide the available locations both among various virtual channels on the network (and in some cases, sub-channels of the virtual channels) and among the various agents on the network. Each virtual channel/subchannel and agent may be allocated at least one storage location, and credits may be used to track and control how many in-flight packets there are in each virtual channel/subchannel and destination agent. Credits may be consumed when packets are transmitted, and freed when the packets arrive at the destination. With segmentation, the number of destinations tracked in the scheme may be based on the number of agents and S2S network interface circuits within the segment, rather than across the full network. Thus, the reduced resources may be achieved.

The S2S network interface circuits may be bridges between network segments, participating as sources and destinations for packets on the segments to which they are coupled. Accordingly, the S2S network interface circuits may terminate packets (or sink packets) that are sourced on a segment and have a destination on a different segment. The S2S network interface circuits may source packets on a segment that were received from a different segment, relaying the packets on toward the destination agent.

In an embodiment, a system may include a plurality of independent networks. The networks may be physically independent (e.g., having dedicated wires and other circuitry that form the network) and logically independent (e.g., communications sourced by agents may be logically defined to be transmitted on a selected network of the plurality of networks and may not be impacted by transmission on other networks). The independent networks may be independently segmented as well. Other embodiments may employ a single segmented network.

By providing physically and logically independent networks, high bandwidth may be achieved via parallel communication on the different networks. Additionally, different traffic may be transmitted on different networks, and thus a given network may be optimized for a given type of traffic. For example, processors such as central processing units (CPUs) may be sensitive to memory latency and may cache data that is expected to be coherent among the processors and memory. Accordingly, a CPU network may be provided on which the CPUs and the memory controllers in a system are agents. The CPU network may be optimized to provide low latency. For example, there may be virtual channels for low latency requests and bulk requests, in an embodiment. The low latency requests may be favored over the bulk requests in forwarding around the fabric and by the memory controllers. The CPU network may also support cache coherency with messages and protocol defined to communicate coherently. Another network may be an input/output (I/O) network. This network may be used by various peripheral devices ("peripherals") to communicate with memory. The network may support the bandwidth needed by the peripherals and may also support cache coherency. However, I/O traffic may sometimes have significantly higher latency than CPU traffic. By separating the I/O traffic from the CPU to memory traffic, the CPU traffic may be less affected by the I/O traffic. The CPUs may be included as agents on the I/O network as well to manage coherency and to communicate with the peripherals. Yet another network, in an embodiment, may be a relaxed order network. The CPU and I/O networks may both support ordering models among the communications on those networks that provide the ordering expected by the CPUs and peripherals. However, the relaxed order network may be non-coherent and may not enforce as many ordering constraints. The relaxed order network may be used by graphics processing units (GPUs) to communicate with memory controllers. Thus, the GPUs may have dedicated bandwidth in the networks and may not be constrained by the ordering required by the CPUs and/or peripherals. Other embodiments may employ any subset of the above networks and/or any additional networks, as desired.

A network switch circuit (or more briefly "network switch") may be a circuit that is configured to receive communications on a network and forward the communications on the network in the direction of the destination of the communication. For example, a communication sourced by a processor may be transmitted to a memory controller that controls the memory that is mapped to the address of the communication. At each network switch, the communication may be transmitted forward toward the memory controller. If the communication is a read, the memory controller may communicate the data back to the source and each network switch may forward the data on the network toward the source. In an embodiment, the network may support a plurality of virtual channels. The network switch may employ resources dedicated to each virtual channel (e.g., buffers) so that communications on the virtual channels may remain logically independent. The network switch may also employ arbitration circuitry to select among buffered communications to forward on the network. Virtual channels may be channels that physically share a network, but which are logically independent on the network (e.g., communications in one virtual channel do not block progress of communications on another virtual channel). A plurality of network switches may thus form a switched fabric for packet transmission within a network segment. The plurality of network switches may thus have resources to manage packets between sources and destinations on the segment (including one or more S2S network interface circuits that bridge to other network segments). Fewer resources may be employed in a given network switch (e.g., fewer buffers) than if an unsegmented network is used, in an embodiment.

Furthermore, an implementation in which segments correspond to integrated circuit boundaries may also provide a scalable solution in which a given integrated circuit implementation may be used in systems that use two instances of the integrated circuit as well as systems in which more than two instances of the integrated circuit are used (e.g., 4 instances, 8 instances, etc.). The same implementation may be used since the segment boundary and the IC boundary are co-extensive (e.g., the same, or overlapping). A given IC could may have more than one segment in it, but the IC boundary may be a segment boundary for at least one of the segments on the IC.

An agent circuit may generally be any device (e.g., processor, peripheral, memory controller, etc.) that may source and/or sink communications on a network. A source agent generates (sources) a communication, and a destination agent receives (sinks) the communication. A given agent may be a source agent for some communications and a destination agent for other communications. In an embodiment, the communications may be packets generated according to a packet definition implemented by the agents.

FIG. 1 is a block diagram of a system including one embodiment of multiple networks interconnecting agents. In FIG. 1, agents 10A, 10B, and 10C are illustrated, although any number of agents may be included in various embodiments. The agents 10A-10B are coupled to a network 12A and the agents 10A and 10C are coupled to a network 12B. Any number of networks 12A-12B may be included in various embodiments as well. The network 12A includes a plurality of network switches including network switches 14AA, 14AB, 14AM, and 14AN (collectively network switches 14A); and, similarly, the network 12B includes a plurality of network switches including network switches 14BA, 14BB, 14BM, and 14BN (collectively network switches 14B). Different networks 12A-12B may include different numbers of network switches 14A-14B. Additionally, the networks 12A-12B include physically separate connections ("wires," "busses," or "interconnect"), illustrated as various arrows in FIG. 1.

Since each network 12A-12B has its own physically and logically separate interconnect and network switches, the networks 12A-12B are physically and logically separate. A communication on network 12A is unaffected by a communication on network 12B, and vice versa. Even the bandwidth on the interconnect in the respective networks 12A-12B is separate and independent.

Optionally, an agent 10A-10C may be coupled to a network interface circuit (reference numerals 16A-16C, respectively). The network interface circuits 16A-16C may be configured to transmit and receive traffic on the networks 12A-12B on behalf of the corresponding agents 10A-10C. The network interfaces 16A-16C may be configured to convert or modify communications issued by the corresponding agents 10A-10C to conform to the protocol/format of the networks 12A-12B, and to remove modifications or convert received communications to the protocol/format used by the agents 10A-10C. Thus, the network interface circuits 16A-16C may be used for agents 10A-10C that are not specifically designed to interface to the networks 12A-12B directly. In some cases, an agent 10A-10C may communicate on more than one network (e.g., agent 10A communicates on both networks 12A-12B in FIG. 1). The corresponding network interface circuit 16A may be configured to separate traffic issued by the agent 10A to the networks 12A-12B according to which network 12A-12B each communication is assigned; and the network interface circuit 16A may be configured to combine traffic received from the networks 12A-12B for the corresponding agent 10A. Any mechanism for determining which network 12A-12B is to carry a given communication may be used (e.g., based on the type of communication, the destination agent 10B-10C for the communication, address, etc. in various embodiments). Alternatively, there may be separate network interface circuits for each network to which an agent is coupled. While the network interface circuits 16A-16C are illustrated separate from the networks 12A-12B, the network interface circuits may also be viewed as part of the networks 12A-12B.

Since networks 12A-12B are physically and logically independent, different networks may have different topologies. For example, a given network may have a ring, mesh, a tree, a star, a fully connected set of network switches (e.g., switch connected to each other switch in the network directly), a shared bus with multiple agents coupled to the bus, etc. or hybrids of any one or more of the topologies. Each network 12A-12B may employ a topology that provides the bandwidth and latency attributes desired for that network, for example, or provides any desired attribute for the network. Thus, generally, the SOC may include a first network constructed according to a first topology and a second network constructed according to a second topology that is different from the first topology.

Additional details regarding other aspects of the independent networks may be found in FIG. 5 and are discussed in more detail below. One or more of the networks may be segmented as described herein.

Figure 2:
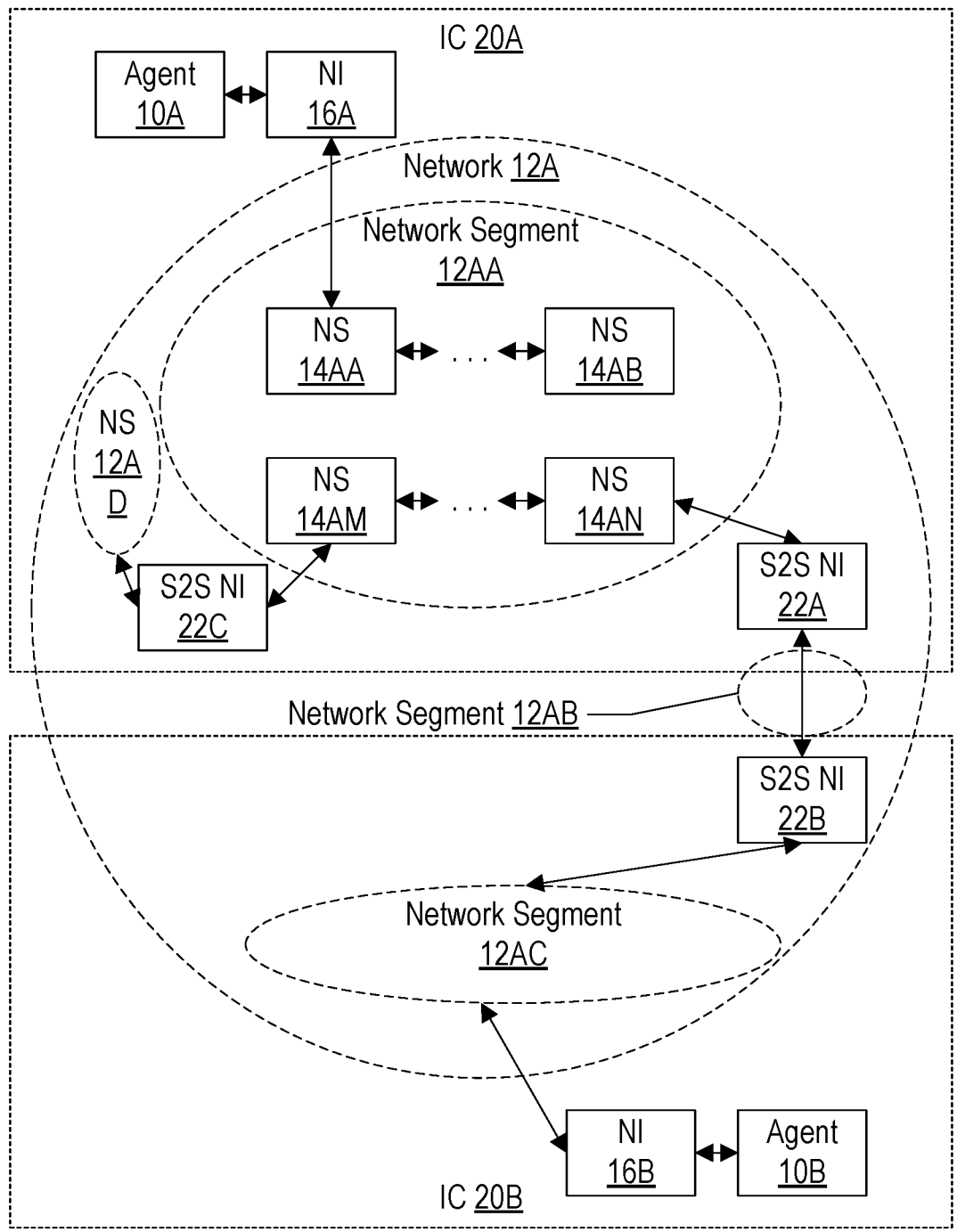
FIG. 2 is a block diagram of one embodiment of multiple integrated circuits with a network having multiple network segments.

FIG. 2 is a block diagram illustrating a system include a plurality of integrated circuits (ICs) 20A-20B having the plurality of agents 10A-10B distributed across the integrated circuits 20A-20B. The agents 10A-10B are coupled (through network interface circuits (NI circuits) 16A-16C in this embodiment) to the network 12A. More particularly, the network 12A includes a plurality of network segments 12AA-12AD. The system further includes S2S NI circuits 22A-22D. The S2S NI circuit 22A is coupled to network segment 12AA and network segment 12AB (and more particularly to the network switch 14AN in the network segment 12AA). The S2S NI circuit 22C is coupled to the network segment 12AA (and more particularly the network switch 14AM) and to the network segment 12AD. On the integrated circuit 20B, the S2S NI circuit 22B is coupled to the network segment 12AB and to the network segment 12AC. The NI circuit 16B is coupled to the network segment 12AC, and is coupled to the agent 10B.

The boundaries of the ICs 20A-20B are illustrated by the short-dotted-lined squares in FIG. 2. That is, the components within the corresponding sets of short-dotted-line squares may be implemented wholly or entirely within the corresponding IC 20A-20B. For example, agent 10A, the NI circuit 16A, the network segment 12AA including network switches 14AA-14AN, network segment 12D, and the S2S NI circuits 22A and 22C may be implemented entirely within the IC 20A. The S2S NI circuit 22B, the network segment 12AC, the NI circuit 16B, and the agent 10B may be implemented entirely within the IC 20B.

More particularly, the network segment 12AA may comprise a switched fabric (e.g., formed by the network switch circuits 14AA-14AN) that is implemented entirely within the integrated circuit 20A. The switched fabric may be configured to route packets among a subset of the plurality of agents that are within the first integrated circuit. The S2S NI circuit 22A may be a target destination on the switched fabric for packets that have a destination agent on a different segment. That is, from the perspective of the agents on the network segment 12AA (and particularly, e.g., the source agent that initiated the packet transmission on the network and, e.g., the NI circuit such as the NI circuit 16A that is coupled to the source agent), the packet may have reached its target destination even though the packet may traverse one or more additional network segments to reach the destination agent addressed by the packet. In an embodiment, the NI circuits such as the NI circuit 16A and/or the network switch circuits 14AA-14AN forming the switched network may be programmable with a table to map destination agents outside the network segment 12AA (e.g., on another IC such as IC 20B) to the S2S NI circuit 22A. The table may be programmed to leave destination agents within the network segment 12AA unmodified (e.g., a unity mapping). In embodiments in which a single IC includes multiple network segments, e.g., the IC 20A in FIG. 2 having the network segments 12AA and 12AD entirely within the IC 20A, another S2S NI circuit 22C may be used to bridge to the network segment 12AD and target destination agents on the network segment 12AD may be mapped to the S2S NI circuit 22C.

Viewed in another way, when the S2S NI circuit 22A has received a given packet that has a destination agent on a different network segment, the source agent (and its associated NI circuit) has completed participation in the transmission of the given packet. For example, the S2S NI circuit 22A and a plurality of NI circuits associated with the subset of the plurality of agents on the network segment 12AA may be configured to control packet transmission in the network segment 12AA based on a plurality of credits, wherein an NI circuit associated with the source agent is configured to transmit the given packet based on a credit being available at the S2S NI circuit 22A for the given packet, and wherein the credit is freed to the given NI circuit/source agent based on forwarding of the given packet by the S2S NI circuit 22A on another network segment such as network segment 12AB.

The receiving S2S NI circuit may thus become responsible for completing the transmission of the given packet based on receipt of the given packet from the source network segment. The receiving S2S NI circuit may be a source agent of the given packet on another network segment. For example, the S2S NI circuit 22A may be the source agent on the network segment 12AB, and the S2S NI circuit 22B may be the destination target for the given packet on the network segment 12AB. The packet transmission may be complete from the perspective of the S2S NI circuit 22A based on receipt of the given packet by the S2S NI circuit 22B. For example, the S2S NI circuit 22A may be configured to transmit the first packet on the second network segment 12AB based on a second plurality of credits associated with the second network segment. The S2S NI circuit 22B may become responsible for the transmission of the given packet based on receipt of the given packet by the S2S NI circuit 22B, and the credit consumed by the S2S NI circuit 22A to transmit the packet may be freed based on receipt of the given packet by the S2S NI circuit 22B.

For an embodiment in which multiple network segments are wholly within a given IC (e.g., the network segments 12AA and 12AD in the IC 20A in FIG. 2), the S2S NI circuit 22C may be the target destination on the first network segment 12AA for destination agents on the network segment 12AD, and may be the source agent on the network segment 12AD. In this case, the destination agent may be on the network segment 12AD and thus a given packet may traverse two network segments rather than three (or more) in the case of a packet traveling to another IC. Alternatively, the network segment 12AD may also have another S2S NI circuit (not shown in FIG. 2) to bridge to a network segment on yet another IC (not shown in FIG. 2).

The S2S NI circuit 22B may be coupled to a third network segment 12AC of the plurality of network segments. The network segment 12AC may be implemented entirely within the IC 20B, and thus the destination agent for the given packet may be coupled to the network segment 12AC (e.g., the agent 10B through the NI circuit 16B in FIG. 2). Alternatively, additional ICs (not shown in FIG. 2) may be reached via another S2S NI circuit (not shown in FIG. 2). That is, ICs may be effectively daisy-chained as desired.

The implementation of various network segments within a given network may vary. For example, the network segment 12AA may be a switched fabric network, but the network segment 12AB may be a point-to-point interconnect on an interposer board or in a multi-chip module package. Network segments entirely within different ICs may have different implementations as well.

In an embodiment, the network segment 12AB may be implemented using a die to die (D2D) interface implemented on each IC, so that the connection between dies may be implemented using only wiring external to the ICs. For example, an embodiment may include an interface that is physically implemented along one edge of a die, and inter-die connection may be made using a relatively simple connection of straight wires between two dies. The S2S NI circuits 22A-22B may be coupled to the D2D interface circuits. Accordingly, in an implementation that supports only a single IC in a system in addition to systems having multiple ICs, the S2S NI circuits 22A-22B may provide a boundary at which full power down of circuitry (e.g., D2D interface circuitry) may be employed for the single IC system. Additionally, the S2S NI circuits 22A-22B may serve as boundaries for clock and power domain crossings, which may simplify power management that relies on clock gating or power gating between clock and power domains.

Figure 3:
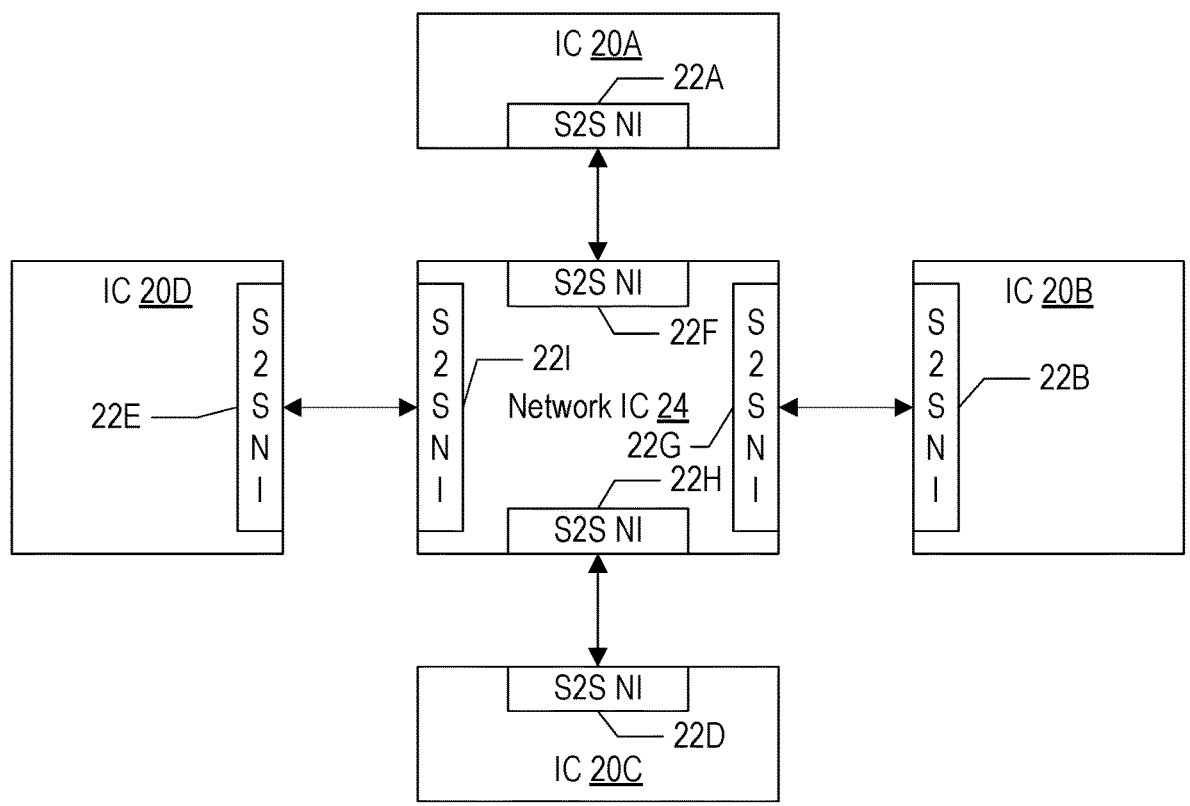
FIG. 3 is a block diagram of one embodiment of a system having multiple integrated circuits including a network integrated circuit.

An alternative to daisy-chaining more than two ICs (as mentioned above) may be to include a network IC in the system, e.g., the embodiment shown in FIG. 3. In FIG. 3, a network IC 24 is shown coupled to various ICs 20A-20D, each of which may have a plurality of agents on network segments and an S2S NI circuit 22A-22B and 22D-22E (and optionally additional network segments and S2S NI circuits such as the S2S NI circuit 22C and network segment 12AD shown in FIG. 2). The network IC 24 may also have S2S NI circuits 22F-22I to couple to the S2S NI circuits 22A-22B and 22D-22E as shown in FIG. 3. Using a network IC 24 may provide a more balanced latency from a given source agent on one IC 20A-20D to a given destination agent in another IC 20A-20D when compared to the daisy chain, since the same number of network segments may be traversed from any source agent to any target agent in the system.

In the embodiment of FIG. 3, the network IC 24 comprises a plurality of S2S NI circuits 22F-22I and a third network segment wholly within the network IC 24. The S2S NI circuit receiving the packet from the S2S NI circuit on one of the ICs 20A-20D may be the source agent of the packet on the third network segment within the network IC 24. For example, for the given packet discussed above received from the S2S NI circuit 22A on the IC 20A, the S2S NI circuit 22F may receive the given packet and be the source packet in the network IC 24. The S2S NI circuit 22F may be configured to transmit the given packet to a third S2S NI circuit 22G-22I on the network circuit 24 (e.g., based on a third plurality of credits associated with the third network segment). The third S2S NI circuit 22G-22I may be coupled to a fourth network segment of the plurality of network segments, e.g., to the ICs 20B-20D, respectively. A fourth S2S NI circuit 22B or 22D-22F on the corresponding one of the ICs 20B-20D may be coupled to the fourth network segment. The third S2S NI circuit 22G-22I may be configured to transmit the given packet on the fourth network segment (e.g., based on a fourth plurality of credits associated with the fourth network segment). The fourth S2S NI circuit 22B or 22D-22F may be coupled to a fifth network segment of the plurality of network segments that is implemented entirely with the receiving IC 22B-22D, and the fourth S2S NI circuit 22B or 22D-22F may be configured to transmit the given packet on the fifth network segment (e.g., based on a fifth plurality of credits associated with the fifth network segment). The destination agent of the given packet may be coupled to the fifth network segment.

While the embodiment of FIG. 3 illustrates 4 ICs 20A-20D coupled to the network IC 24, other embodiments may have more or fewer ICs coupled to the network chip, up to a total number of S2S NI circuits implemented on the network IC 24. In still other embodiments, a plurality of network ICs in a hierarchical arrangement or a daisy chain arrangement may be used to couple still more ICs 20A-20D. The network IC(s) 24 in a system may include additional functionality, as desired, such as caching and/or processing circuitry.

In an embodiment, the S2S NI circuits may also ensure that certain network deadlock scenarios are not possible in the overall network. For example, a network having a ring topology has a potential deadlock scenario that is typically solved using a dateline or packet coloring virtual network that effectively turns the ring into a spiral. A ring network spanning multiple ICs as illustrated in FIGS. 2-3 breaks the ring into segments, thus providing a solution to the potential deadlock.

It is noted that the segmentation of the networks in the system may be applied to packet networks or other types of interfaces. For example, in one embodiment the agents may include graphics processing units (GPUs). The GPUs may operate in parallel to render a given frame of pixels, for example, but may be physically located on different ICs. A shared workload distribution bus may be used by a controlling workload distribution circuit to transmit workload specifications to the GPUs, instructing them as to which parts of the data describing the frame to operate on. The workload distribution bus may previously have been a dedicated interface only for workload data transmissions. Rather than implementing a separate bus across network segments, the bus may be converted to a packet transmission on one of the existing networks. The packet may be a write packet, for example, to a specific address that is associated with workload distribution bus transmissions. The specific address may be fixed or programmable. The write data may be the data that would have been transmitted on the dedicated workload distribution bus. The workload distribution bus may be assigned its own virtual channel, for example, on the network to which the workload distribution bus is assigned.

Additional details regarding the workload distribution bus, implemented as a separate interface, may be found in co-pending patent application Ser. No. 17/158,943, filed on Jan. 26, 2021. The co-pending application is incorporated herein by reference in its entirety. To the extent that material in the co-pending application conflicts with material expressly set forth herein, the expressly set forth material controls.

In an embodiment, the packets transmitted over a given network may include command only packets (e.g., read requests, coherency messages, acknowledgements, etc.) and command packets that have an accompanying data packet (e.g., write requests, read responses, write backs, etc.). For command packets that have an accompanying data packet, the requesting network interface/agent may wait until both the command and data are ready to transmit on the network and then may transmit then command and data packets in parallel. The packets may travel independent of each other through the network, but the arrival of both packets at the destination without deadlock may be insured.

Figure 4:
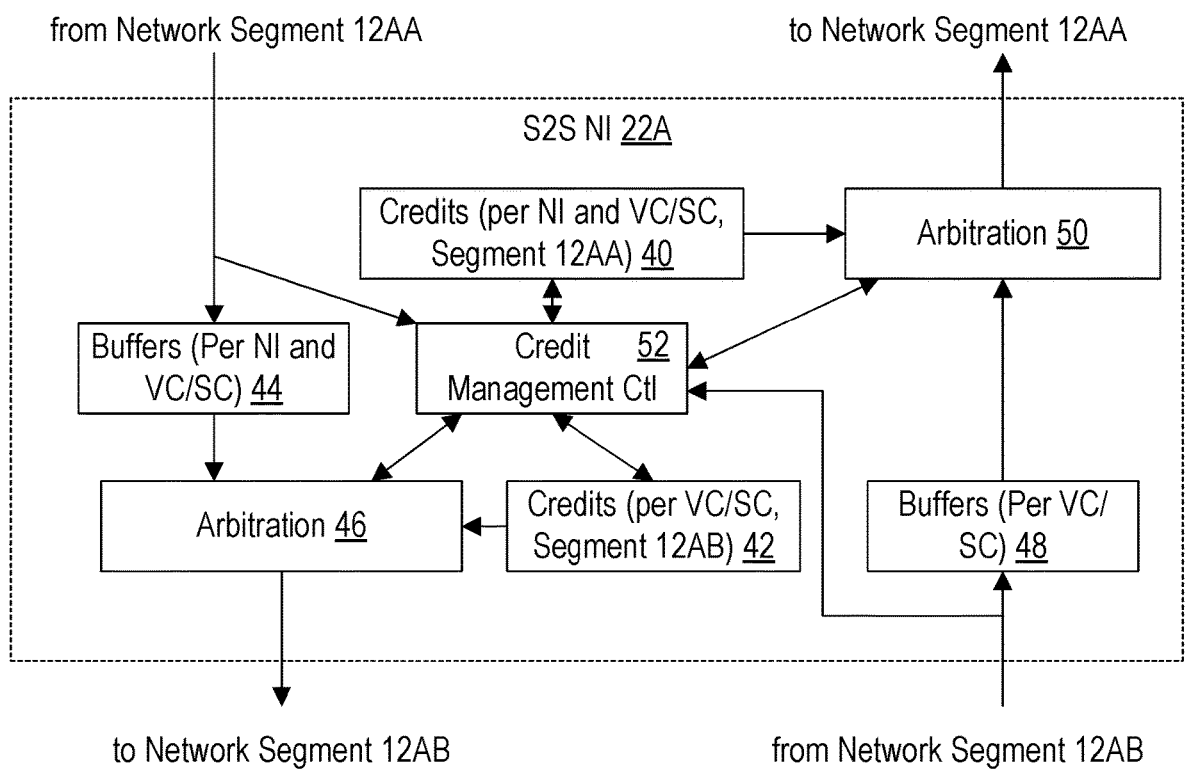
FIG. 4 is a block diagram of one embodiment of segment to segment (S2S) network interface circuit.

FIG. 4 is a block diagram of one embodiment of the S2S NI circuit 22A for use in a credit-based packet control scheme. Other S2S NI circuits used in such schemes may be similar. In the illustrated embodiment, the S2S NI circuit 22A includes a credits storage (e.g., a register or registers) 40 for storing credits for the network segment 12AA and a credits storage 42 for storing credits for the network segment 12AB. The S2S NI circuit 22A includes buffer circuits (more briefly, "buffers") 46 to receive packets from the network segment 12AA and an arbitration circuit 44 to arbitrate for transmission on the network segment 12AB. Similarly, the S2S NI circuit 22A may include buffers 48 to receive packets from the network segment 12AB and an arbitration circuit 50 to arbitrate for transmission on the network segment 12AA. The S2S NI circuit may include a credit management control circuit 52 coupled to the arbitration circuits 46 and 50 and the credit storages 44 and 48.

The buffers 44 are coupled to the network segment 12AA and are configured to receive packets from the network segment 12AA to be transmitted on the network segment 12AB. There may be at least one buffer entry (e.g., storage for at least one packet) for each NI circuit/agent on the network segment 12AA and for each virtual channel supported by that NI circuit/agent. The buffer entries for a given NI circuit/agent may be distributed among the virtual channels and, for those virtual channels that have them, the subchannels of the virtual channels. The number of buffers provided for each NI circuit/agent and the distribution of the buffers among virtual channels may be determined at system initialization, and credits may be provided to the respective NI circuit/agent to represent the available buffers. When sourcing a packet, a given NI circuit/agent consumes a credit for the target destination (either the S2S NI 22A, or one of the other NI circuits/agents on the network segment 12AA) and for the virtual channel and subchannel (if applicable) at the target destination. To source another packet, the given NI circuit/agent requires a credit for that packet's target destination and virtual channel/subchannel. If a credit is not available, the given NI circuit/agent may hold the packet until a credit is freed. Thus, a buffer is guaranteed to be available at the target destination for a packet that is transmitted onto the network segment 12AA. Accordingly, receipt of a packet by the buffers 44 may be performed without delay or potential back pressure to the network segment 12AA.

The arbitration circuit 46 may be coupled to the buffers 44 and to the credits storage 42. The arbitration circuit 46 may be configured to ensure that each potential packet in the buffers 44 has an available credit in the credits storage 42, and may arbitrate among those packets that are ready to send (e.g., both command and data packets have arrived, for a communication that includes both command and data) and that have an available credit at their target destination on the network segment 12AB. Any arbitration scheme may be used (e.g., round robin, weighted round robin, priority-based, combinations of the above, or any other scheme). If a packet is select, the arbitration circuit 46 may be configured to read the packet and transmit it on the network segment 12AB, and may inform the credit management control circuit 52. The credit management control circuit 52 may consume a corresponding credit from the credits storage 42 (e.g., deducting a credit from the target destination's virtual channel/subchannel). Additionally, the credit management control circuit 52 may transmit a freed credit corresponding to the packet on the network segment 12AA to the source agent/NI circuit through the arbitration circuit 42. Freed credits may be carried in other packets on the network segment 12AA, e.g., in a header of the packet. Freed credits may be transmitted in dedicated packets. Both transmission of freed credits in other packets and in dedicated packets may also be support, in some embodiments.

The credit management control circuit 52 may also monitor the network segment 12AB to detect credits freed by target destinations on the network segment 12AB (e.g., the S2S NI circuit 22B, in the embodiment of FIG. 2). Freed credits may be carried in other packets on the network segment 12AB, e.g., in a header of the packet. Freed credits may be transmitted in dedicated packets. Both transmission of freed credits in other packets and in dedicated packets may also be support, in some embodiments. Based on receipt of a freed credit, the credit management control circuit 42 may be configured to increment the corresponding credit in the credits storage 42.

In a similar fashion, packets may be received from the network segment 12AB into the buffers 48, and the arbitration circuit 50 may arbitrate among the ready packets based on the credits on the credits storage 40 (which may be stored per NI circuit/agent on the network segment and per virtual channel/subchannel at the NI circuit/agent) using any desired arbitration scheme. The arbitration circuit 50 may read a selected packet from the buffers 48 and transmit it on the network segment 12AA. The arbitration circuit 50 may inform the credit management circuit 52, which may decrement the corresponding credit in the credits storage 40. The credit management circuit 52 may be configured to monitor the network segment 12AA for freed credits to increment the corresponding credit in the credits storage 40.

An NI circuit such as NI circuit 16A may be similar to a portion of the S2S NI circuit 22A as shown in FIG. 4, in one embodiment. For example, an implementation of the NI circuit may include the buffers 44, the arbitration circuit 46, the credits storage 42, and the credit management control circuit 52 (and the credits storage 42 may have credits per NI/agent and S2S NI circuit on the network segment). The buffers 44 may receive packets from the agent for transmission on the network segment. The NI circuit may also have buffers to receive packets, but may not require arbitration to deliver them to the agent.

Figure 5:
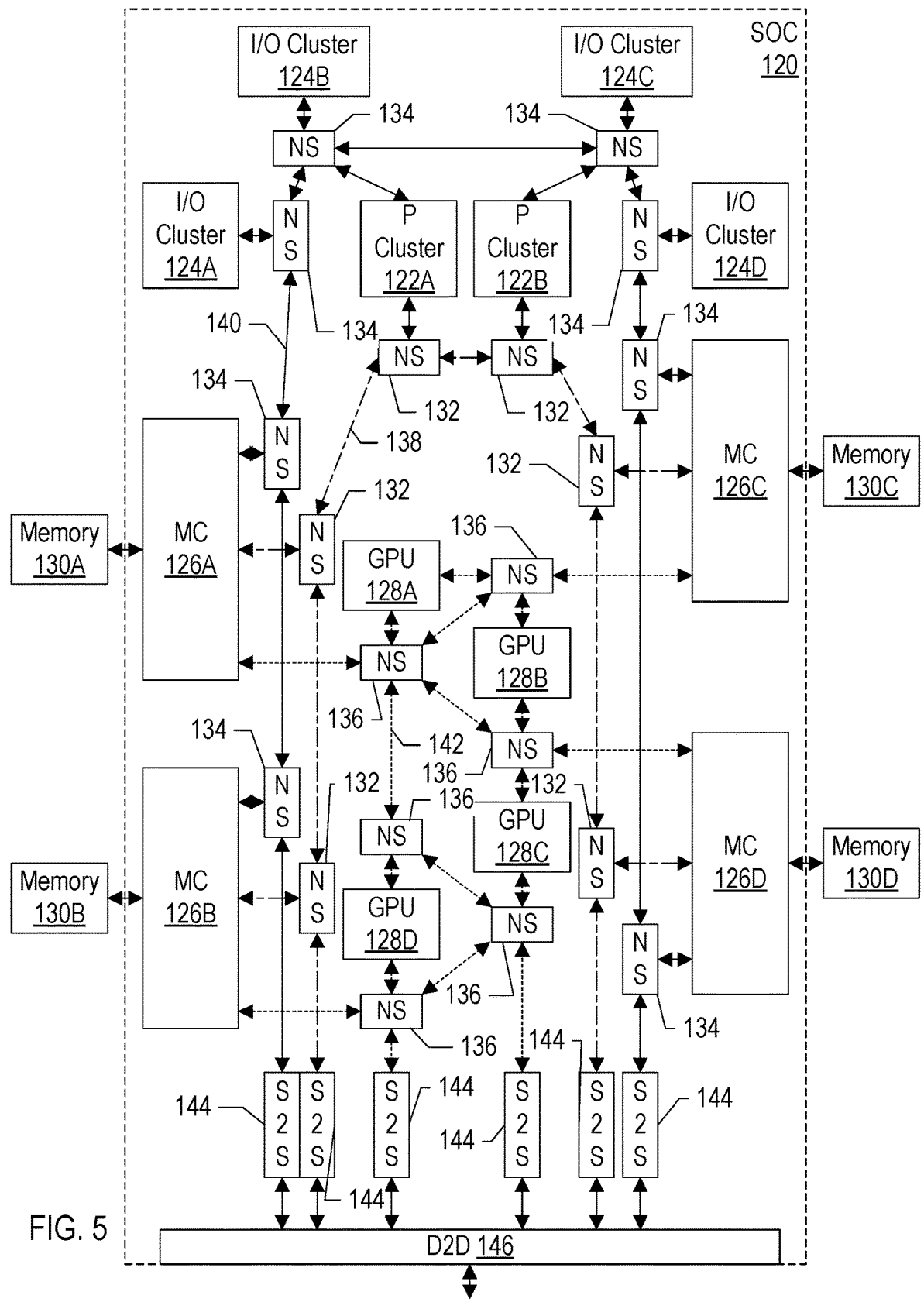
FIG. 5 is a block diagram of one embodiment of a system on a chip (SOC).

FIG. 5 is a block diagram of one embodiment of a system on a chip (SOC) 120 having multiple networks for one embodiment. In the embodiment of FIG. 5, the SOC 120 includes a plurality of processor clusters (P clusters) 122A-122B, a plurality of input/output (I/O) clusters 124A-124D, a plurality of memory controllers 126A-126D, and a plurality of graphics processing units (GPUs) 128A-128D. As implied by the name (SOC), the components illustrated in FIG. 5 (except for the memories 130A-130D in this embodiment) may be integrated onto a single semiconductor die or "chip." However, other embodiments may employ two or more die coupled or packaged in any desired fashion. Additionally, while specific numbers of P clusters 122A-122B, I/O clusters 124A-124D, memory controllers 126A-

126D, and GPUs 128A-128D are shown in the example of FIG. 5, the number and arrangement of any of the above components may be varied and may be more or less than the number shown in FIG. 5. The memories 130A-130D are coupled to the SOC 120, and more specifically to the memory controllers 126A-126D respectively as shown in FIG. 5.

In the illustrated embodiment, the SOC 120 includes three physically and logically independent networks formed from a plurality of network switches 132, 134, and 136 as shown in FIG. 5 and interconnect therebetween, illustrated as arrows between the network switches and other components. Other embodiments may include more or fewer networks. The network switches 132, 134, and 136 may be instances of network switches similar to the network switches 14AA-14BN as described above with regard to FIG. 1, for example. Thus, the network switches 132, 134, and 136 may each form switched networks that are implemented entirely within the SOC 120. The plurality of network switches 132, 134, and 136 are coupled to the plurality of P clusters 122A-122B, the plurality of GPUs 128A-128D, the plurality of memory controllers 26A-25B, and the plurality of I/O clusters 124A-124D as shown in FIG. 5. The P clusters 122A-122B, the GPUs 128A-128D, the memory controllers 126A-126D, and the I/O clusters 124A-124D may all be examples of agent circuits that communicate on the various networks of the SOC 120. Other agent circuits may be included as desired.

In FIG. 5, a central processing unit (CPU) network is formed from a first subset of the plurality of network switches (e.g., network switches 132) and interconnect therebetween illustrated as short dash/long dash lines such as reference numeral 138. The CPU network couples the P clusters 122A-122B and the memory controllers 126A-126D. An I/O network is formed from a second subset of the plurality of network switches (e.g., network switches 134) and interconnect therebetween illustrated as solid lines such as reference numeral 140. The I/O network couples the P clusters 122A-122B, the I/O clusters 124A-124D, and the memory controllers 126A-126D. A relaxed order network is formed from a third subset of the plurality of network switches (e.g., network switches 136) and interconnect therebetween illustrated as short dash lines such as reference numeral 142. The relaxed order network couples the GPUs 128A-128D and the memory controllers 126A-126D. In an embodiment, the relaxed order network may also couple selected ones of the I/O clusters 124A-124D as well. As mentioned above, the CPU network, the I/O network, and the relaxed order network are independent of each other (e.g., logically and physically independent). In an embodiment, the protocol on the CPU network and the I/O network supports cache coherency (e.g., the networks are coherent). The relaxed order network may not support cache coherency (e.g., the network is non-coherent). The relaxed order network also has reduced ordering constraints compared to the CPU network and I/O network. For example, in an embodiment, a set of virtual channels and subchannels within the virtual channels are defined for each network. For the CPU and I/O networks, communications that are between the same source and destination agent, and in the same virtual channel and subchannel, may be ordered. For the relaxed order network, communications between the same source and destination agent may be ordered. In an embodiment, only communications to the same address (at a given granularity, such as a cache block) between the same source and destination agent may be ordered. Because less strict ordering is enforced on the relaxed-order network, higher bandwidth may be achieved on average since transactions may be permitted to complete out of order if younger transactions are ready to complete before older transactions, for example.

The interconnect between the network switches 132, 134, and 136 may have any form and configuration, in various embodiments. For example, in one embodiment, the interconnect may be point-to-point, unidirectional links (e.g., busses or serial links). Packets may be transmitted on the links, where the packet format may include data indicating the virtual channel and subchannel that a packet is travelling in, memory address, source and destination agent identifiers, data (if appropriate), etc. Multiple packets may form a given transaction. A transaction may be a complete communication between a source agent and a target agent. For example, a read transaction may include a read request packet from the source agent to the target agent, one or more coherence message packets among caching agents and the target agent and/or source agent if the transaction is coherent, a data response packet from the target agent to the source agent, and possibly a completion packet from the source agent to the target agent, depending on the protocol. A write transaction may include a write request packet from the source agent to the target agent, one or more coherence message packets as with the read transaction if the transaction is coherent, and possibly a completion packet from the target agent to the source agent. The write data may be included in the write request packet or may be transmitted in a separate write data packet from the source agent to the target agent, in an embodiment.

The arrangement of agents in FIG. 5 may be indicative of the physical arrangement of agents on the semiconductor die forming the SOC 120, in an embodiment. That is, FIG. 5 may be viewed as the surface area of the semiconductor die, and the locations of various components in FIG. 5 may approximate their physical locations with the area. Thus, for example, the I/O clusters 124A-124D may be arranged in the semiconductor die area represented by the top of SOC 120 (as oriented in FIG. 5). The P clusters 122A-122B may be arranged in the area represented by the portion of the SOC 120 below and in between the arrangement of I/O clusters 124A-124D, as oriented in FIG. 5. The GPUs 128A-128D may be centrally located and extend toward the area represented by the bottom of the SOC 120 as oriented in FIG. 5. The memory controllers 126A-126D may be arranged on the areas represented by the right and the left of the SOC 120, as oriented in FIG. 5.

In an embodiment, the SOC 120 may be designed to couple directly to one or more other instances of the SOC 120, coupling a given network on the instances as logically one network on which an agent on one die may communicate logically over the network to an agent on a different die in the same way that the agent communicates within another agent on the same die. As mentioned above, each network implemented entirely within a given instance of the SOC 120 may be a network segment in the overall network implemented across the SOC 120 die instances. While the latency may be different when a packet is transmitted between dies, the communication may be performed in the same fashion. Thus, as illustrated in FIG. 5, the networks extend to the bottom of the SOC 120 as oriented in FIG. 5. The networks may each have S2S NI circuits 144, which may be similar to the S2S NI circuits 22A-22J described herein. Thus, packets sourced within the SOC 120 having destination agents external to the SOC 120 may terminate, from the perspective of the source agents in the SOC 120, at the S2S NI circuits 144.

Additionally, a die-to-die (D2D) interface circuit 146 is shown in FIG. 5, coupled to the S2S NI circuits 144. The D2D interface circuit 146 may include any sort of interface circuitry (e.g., serializer/deserializer (SERDES) circuits, single-ended driver/receiver circuits, bi-directional driver/receiver circuits, etc.) and may be used to communicate across the die boundary to another die (e.g., another instance of the SOC 120 or a network IC 34 as shown in FIG. 3). Thus, the networks may be scalable to two or more semiconductor dies. For example, the two or more semiconductor dies may be configured as a single system in which the existence of multiple semiconductor dies is transparent to software executing on the single system. In an embodiment, the delays in a communication from die to die may be minimized, such that a die-to-die communication typically does not incur significant additional latency as compared to an intra-die communication as one aspect of software transparency to the multi-die system. In other embodiments, the networks may be closed networks that communicate only intra-die.

As mentioned above, different networks may have different topologies. In the embodiment of FIG. 5, for example, the CPU and I/O networks implement a ring topology, and the relaxed order may implement a mesh topology. However, other topologies may be used in other embodiments. The network switches 132 and 134, respectively, form a ring when coupled to the corresponding switches on another die through the S2S NI circuits 144 and the D2D interface circuits 146 of the die. If only a single die is used, a connection may be made between the two network switches 132 or 134 at the bottom of the SOC 120 as oriented in FIG. 5. Alternatively, the two network switches 132 or 134 at the bottom may have links between them that may be used in a single die configuration, or the network may operate with a daisy-chain topology.

Similarly, the connection of the network switches 136 in a mesh topology between the GPUs 128A-128D and the memory controllers 126A-126D is shown. As previously mentioned, in an embodiment, one or more of the I/O clusters 124A-124D may be coupled to the relaxed order network was well. For example, I/O clusters 124A-124D that include video peripherals (e.g., a display controller, a memory scaler/rotator, video encoder/decoder, etc.) may have access to the relaxed order network for video data.

The processor clusters 122A-122B may each comprise one or more processors and optionally may include other circuitry such as interrupt controllers and/or one or more levels of external cache. For example, in an embodiment, the processor clusters 122A-122B may comprises a last level cache (LLC). The LLC may include interface circuitry to interface to the network switches 132 and 134 to transmit transactions on the CPU network and the I/O network, as appropriate.

A processor may include any circuitry and/or microcode configured to execute instructions defined in an instruction set architecture implemented by the processor. The processor may have any microarchitectural implementation, performance and power characteristics, etc. For example, processors may be in order execution, out of order execution, superscalar, superpipelined, etc.

The LLC and any caches within the processors may have any capacity and configuration, such as set associative, direct mapped, or fully associative. The cache block size may be any desired size (e.g., 32 bytes, 64 bytes, 128 bytes, etc.). The cache block may be the unit of allocation and deallocation in the LLC 70. Additionally, the cache block may be the unit over which coherency is maintained in this embodiment. The cache block may also be referred to as a cache line in some cases. In an embodiment, a distributed, directory-based coherency scheme may be implemented with a point of coherency at each memory controller 126 in the system, where the point of coherency applies to memory addresses that are mapped to that memory controller. The directory may track the state of cache blocks that are cached in any coherent agent. The coherency scheme may be scalable to many memory controllers over possibly multiple semiconductor dies.

The I/O clusters 124A-124D may generally include one or more peripherals and/or peripheral interface controllers, and may include a bridge from the peripherals/peripheral controllers to the switched fabrics in the SOC 120.

The peripherals may include any set of additional hardware functionality (e.g., beyond CPUs, GPUs, and memory controllers) included in the SOC 120. For example, the peripherals may include video peripherals such as an image signal processor configured to process image capture data from a camera or other image sensor, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include networking peripherals such as media access controllers (MACs). The peripherals may include other types of memory controllers such as non-volatile memory controllers. Some peripherals may include on on-chip component and an off-chip component. A peripheral interface controller may include interface controllers for various interfaces external to the SOC, including interfaces such as Universal Serial Bus (USB), peripheral component interconnect (PCI) including PCI Express (PCIe), serial and parallel ports, etc.

The bridge may be configured to convert communications on a local interconnect to peripherals/peripheral interface units to communications on the system-wide interconnect and vice-versa. The bridge may be coupled to one of the network switches 134, in an embodiment. The bridge may also manage ordering among the transactions issued from the peripheral and peripheral interface circuits. For example, the bridge may use a cache coherency protocol supported on the networks to ensure the ordering of the transactions on behalf of the peripherals/peripheral interface circuits. Different peripherals may have different ordering requirements, and the bridge may be configured to adapt to the different requirements. The bridge may implement various performance-enhancing features as well, in some embodiments. For example, the bridge may prefetch data for a given request. The bridge may capture a coherent copy of a cache block (e.g., in the exclusive state) to which one or more transactions from the peripherals are directed, to permit the transactions to complete locally and to enforce ordering. The bridge may speculatively capture an exclusive copy of one or more cache blocks targeted by subsequent transactions, and may use the cache block to complete the subsequent transactions if the exclusive state is successfully maintained until the subsequent transactions can be completed (e.g., after satisfying any ordering constraints with earlier transactions). Thus, in an embodiment, multiple requests within a cache block may be serviced from the cached copy.

The memory controllers 126A-126D may generally include the circuitry for receiving memory operations from the other components of the SOC 120 and for accessing the memory 130A-130D to complete the memory operations. The memory controllers 126A-126D may be configured to access any type of memory 130A-130D. For example, the memory 130A-130D may be static random-access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g., LPDDR such as LP3, LP4, LP5, etc., mDDR, etc.). The memory controllers 126A-126D may include queues for memory operations, for ordering (and potentially reordering) the operations and presenting the operations to the memory 130A-130D. The memory controllers 126A-126D may further include data buffers to store write data awaiting write to memory and read data awaiting return to the source of the memory operation. In some embodiments, the memory controllers 126A-126D may include a memory cache (MCache) to store recently accessed memory data. In SOC implementations, for example, the MCache may reduce power consumption in the SOC by avoiding reaccess of data from the memory 16 if it is expected to be accessed again soon. In some cases, the MCache may also be referred to as a system cache, as opposed to private caches such as the LLC or caches in the processors, which serve only certain components. Additionally, in some embodiments, a system cache need not be located within the memory controllers 126A-126D.

The GPUs 128A-128D may be special purpose processors optimized for graphics operations such as rendering, texturing, shading, etc. The GPUs 128A-128D may implement an instruction set developed with the graphics manipulations in mind, and thus the definition of the instruction set may be markedly different than a general-purpose instruction set. The GPUs may have any microarchitecture that is amendable to high performance execution of the GPU instruction set. For example, GPUs may be wide issue arrays of texture processing circuits, pixel processing circuits, shader circuits, and any other such circuits.

Figure 6:
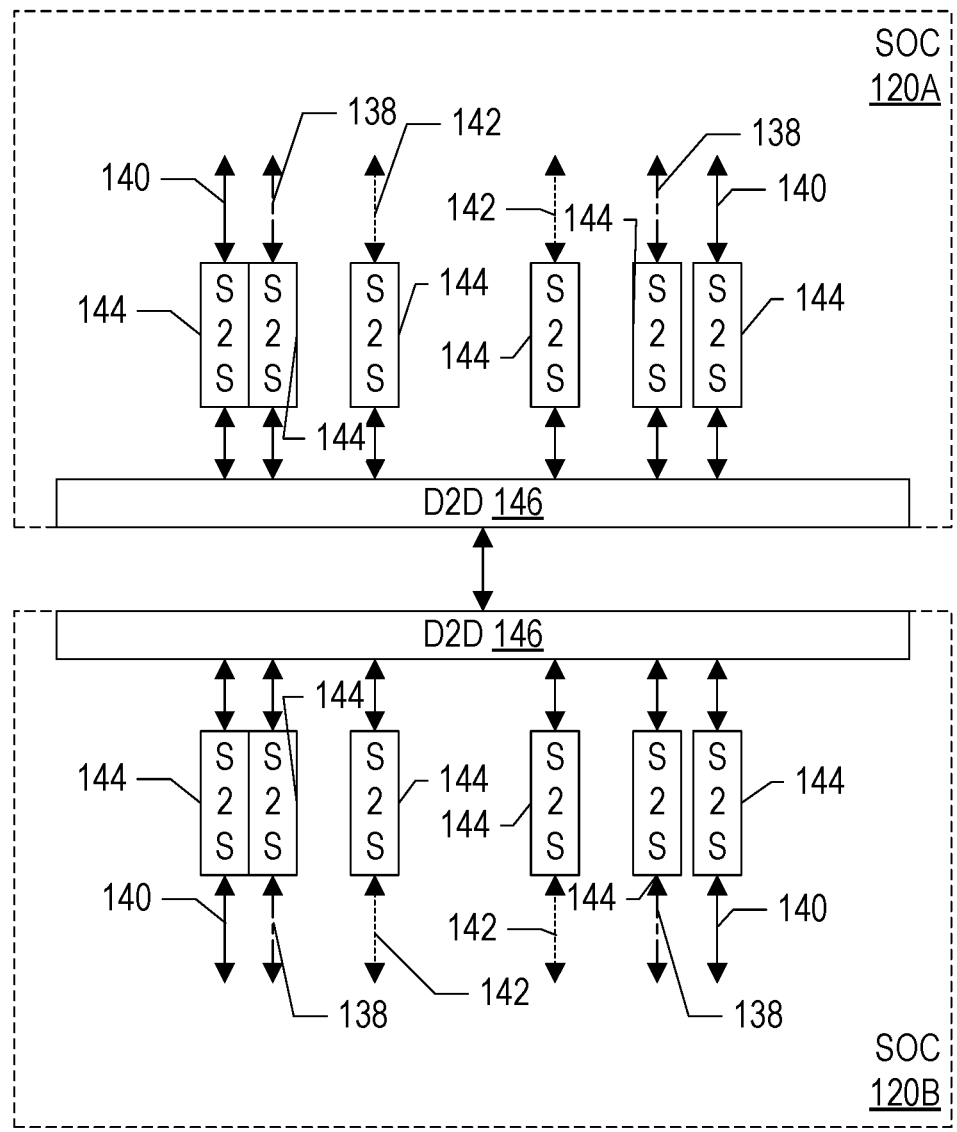
FIG. 6 is a block diagram of one embodiment of a portion of a system including a pair of SOCs.

FIG. 6 is a block diagram of a two-die system in which each network extends across the two SOC dies 120A-120B, forming networks that are logically the same even though they extend over two die. The S2S NI circuits 144 are shown, coupled to the I/O network (solid lines 140), the CPU network (short and long dashed lines 138), and the relaxed order network (short dashed lines 142). The S2S NI circuits 144 and the network switches within the same SOC 120A-120B may thus form network segments. Another network segment may be formed form the S2S NI circuits 144 for a given network (CPU, I/O, or relaxed order) on both SOCs 120A-120B along with the D2D interface circuits 146. Thus, for example, an agent on the CPU network in the SOC 120A may source a packet having a destination agent on the SOC 120B. The packet may be routed to one of the S2S NI circuits 144 coupled to the CPU network (lines 138), which may terminate the packet on the network segment within the SOC 120A. The S2S NI circuit 144 may source the packet on the inter-die network segment formed from the S2S NI circuits 144 and the D2D interface circuits 146, which may have a target destination in the opposite S2S NI circuit 144 on the CPU network (lines 138) in the SOC 120B. The receiving S2S NI circuit 144 may terminate the packet on the inter-die network segment and may source the packet on the network segment within the SOC 120B, on which the destination agent communicates. Thus, three network segments may be traversed from source agent to the destination agent in the embodiment of FIG. 6. Similarly, three network segments may form the I/O network and three network segments may form the relaxed order network in the embodiment of FIG. 6.

Figure 7:
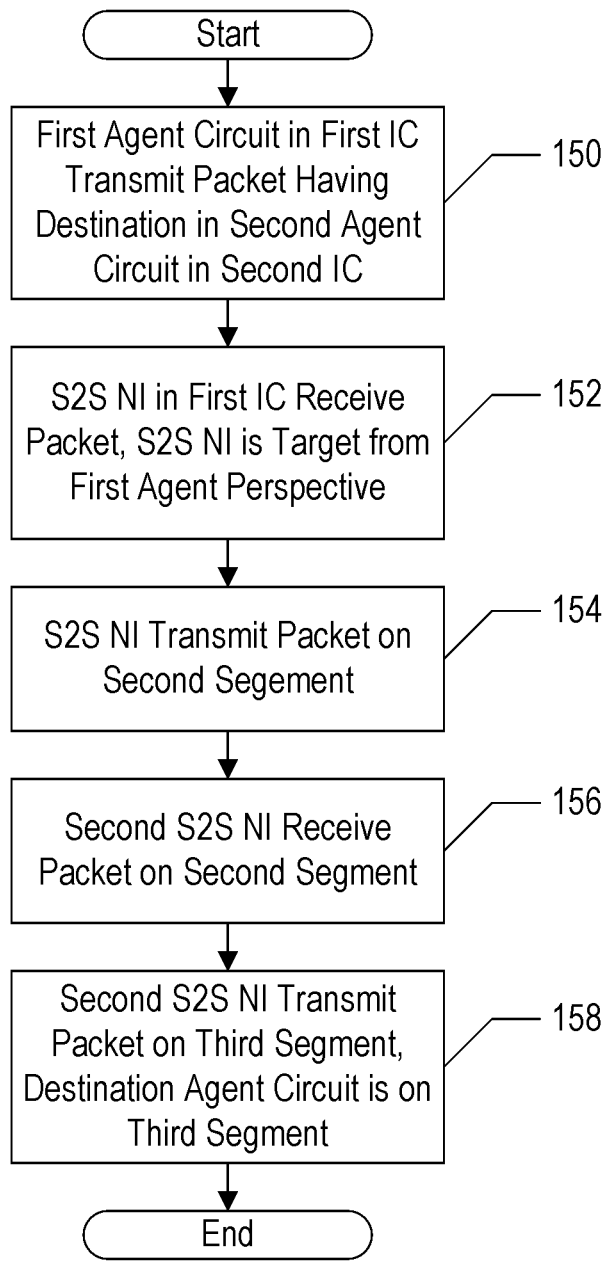
FIG. 7 is a flowchart of one embodiment of certain operations to transmit a packet.

Turning next to FIG. 7, a flowchart is shown illustrating one embodiment of a method for transmitting packets on a segmented network such as the network described herein. While the blocks are shown in a particular order for ease of understand, other orders may be used. Blocks may be performed in parallel in combinatorial logic circuitry in the system. Blocks, combinations of blocks, and/or the flowchart as a whole may be pipeline over multiple clock cycles. The various circuits may be configured to implement the operation described herein.

A first agent circuit, in a first integrated circuit of a plurality of integrated circuits in a system, may transmit a packet having a destination agent circuit in a second integrated circuit of the plurality of integrated circuits (block 150). The first agent circuit is configured to transmit the packet on a switched fabric circuit implemented entirely within the first integrated circuit. The switched fabric circuit may be configured to route packets among a subset of a plurality of agent circuits that are within the first integrated circuit. The switched fabric circuit corresponds to a first segment of a network that includes a plurality of segments. An S2S network interface circuit within the first integrated circuit may receive the packet (block 152). The S2S network interface circuit may be configured to interface the first segment to one or more additional segments within the network. The S2S network interface circuit may be a target destination of the packet from the perspective of the source agent circuit. The S2S network interface circuit may transmit the packet on a second segment of the plurality of segments (block 154).

In an embodiment, a second S2S network interface circuit on a second integrated circuit of the plurality of integrated circuits may receive the packet from the S2S network interface circuit (block 156). The second S2S network interface circuit may transmit the packet on a third segment of the plurality of segments that is implemented entirely within the second integrated circuit. The destination agent circuit of the packet may on the second integrated circuit and is coupled to the third network segment (block 158).

Computer System

Figure 8:
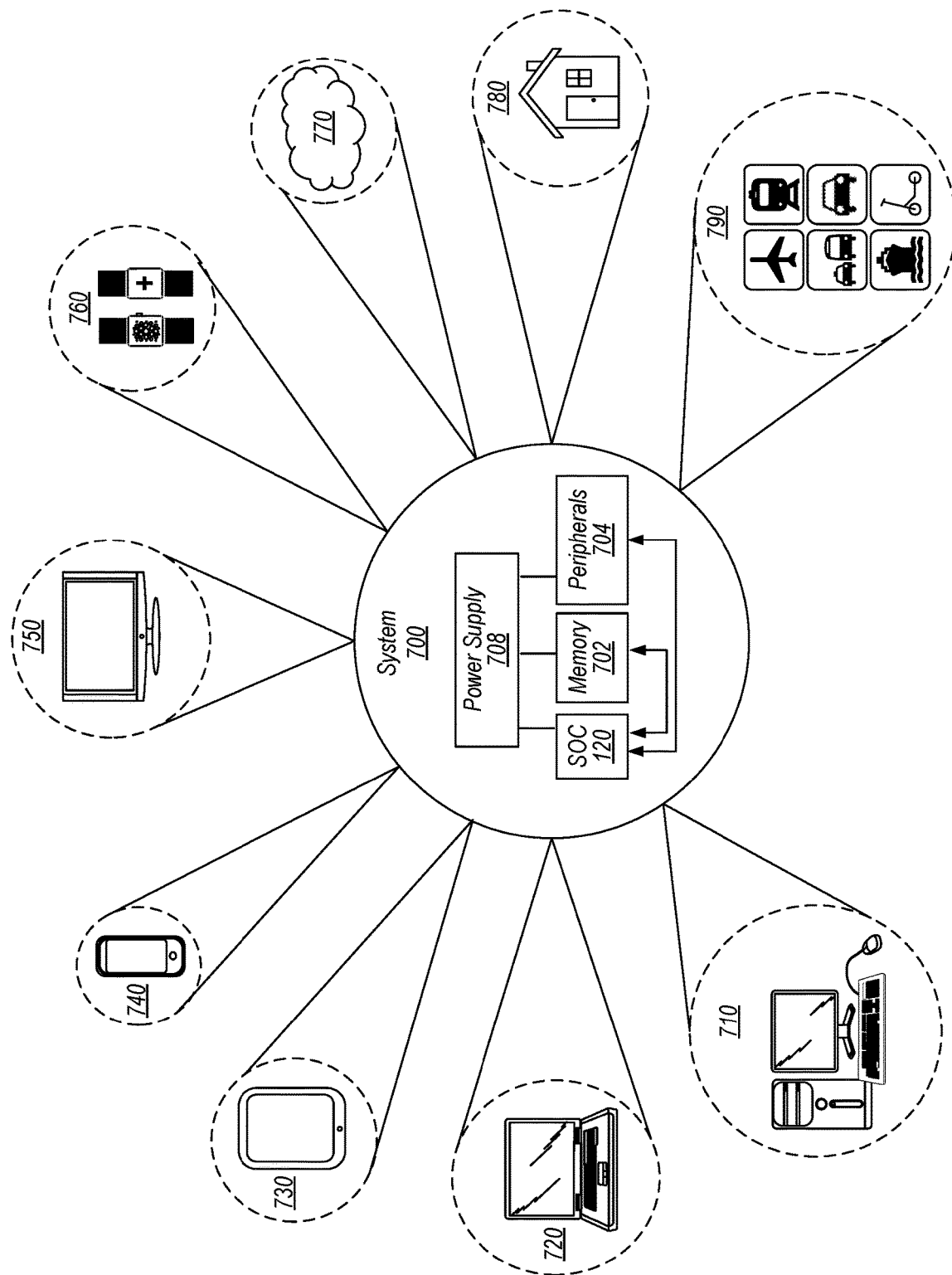
FIG. 8 is a block diagram of one embodiment of a system.

Turning next to FIG. 8, a block diagram of one embodiment of a system 700 is shown. In the illustrated embodiment, the system 700 includes at least one instance of a system on a chip (SOC) 120 coupled to one or more peripherals 704 and an external memory 702. A power supply (PMU) 708 is provided which supplies the supply voltages to the SOC 120 as well as one or more supply voltages to the memory 702 and/or the peripherals 154. In some embodiments, more than one instance of the SOC 120 may be included (and more than one memory 702 may be included as well). The memory 702 may include the memories 130-130D illustrated in FIG. 5, in an embodiment.

The peripherals 704 may include any desired circuitry, depending on the type of system 700. For example, in one embodiment, the system 700 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 120 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 7120, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

Computer Readable Storage Medium

Turning now to FIG. 9, a block diagram of one embodiment of a computer readable storage medium 800 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 9 may store a database 804 representative of the SOC 120. Generally, the database 804 may be a database which can be read by a program and used, directly or indirectly, to fabricate the hardware comprising the SOC 120. For example, the database may be a behavioral-level description or register-transfer level (RTL) description of the hardware functionality in a high-level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the SOC 120. The netlist may then be placed and routed to produce a data set describing geometric shapes to be applied to masks. The masks may then be used in various semiconductor fabrication steps to produce a semiconductor circuit or circuits corresponding to the SOC 120. Alternatively, the database 804 on the computer accessible storage medium 800 may be the netlist (with or without the synthesis library) or the data set, as desired.

While the computer accessible storage medium 800 stores a representation of the SOC 120, other embodiments may carry a representation of any portion of the SOC 120, as desired, including any subset of the components shown in FIG. 5. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement of such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. A system comprising:
    a plurality of integrated circuits that includes a first integrated circuit and a second integrated circuit that are connected through a die-to-die interface circuit;
    a plurality of agent circuits distributed across the plurality of integrated circuits;
    a fabric circuit implemented entirely within the first integrated circuit and configured to route packets among a subset of the plurality of agent circuits that are within the first integrated circuit, wherein the fabric circuit corresponds to a first segment of a network that includes a plurality of segments; and
    a segment-to-segment (S2S) network interface circuit within the first integrated circuit configured to interface the first segment to one or more additional segments within the network; and
    wherein for a given packet having a source agent circuit within the subset and a destination agent circuit external to the first segment, the S2S network interface circuit is a target destination from the perspective of the source agent circuit.

2. The system as recited in claim 1 wherein the source agent circuit has completed participation in the transmission of the given packet based on receipt of the given packet by the S2S network interface circuit.

3. The system as recited in claim 1 wherein the S2S network interface circuit and a plurality of network interface circuits associated with the subset of the plurality of agent circuits are configured to control packet transmission in the first segment based on a plurality of credits, wherein a given network interface circuit associated with the source agent circuit is configured to transmit the given packet based on a credit being available at the S2S network interface circuit for the given packet, and wherein the credit is freed to the given network interface circuit based on receipt of the given packet by the S2S network interface circuit.

4. The system as recited in claim 1 wherein the S2S network interface circuit is coupled to a second segment of the network and is configured to transmit the given packet on the second segment as a source agent circuit on the second segment.

5. The system as recited in claim 4 wherein the second segment is implemented wholly within the first integrated circuit.

6. The system as recited in claim 4 wherein the S2S network interface circuit is configured to transmit the given packet on the second segment based on a second plurality of credits associated with the second segment.

7. The system as recited in claim 4 further comprising a second S2S network interface circuit on the second integrated circuit, wherein a target of the given packet on the second segment is the second S2S network interface circuit.

8. The system as recited in claim 7 wherein the second S2S network interface circuit is coupled to a third segment of the plurality of segments that is implemented entirely within the second integrated circuit.

9. The system as recited in claim 8 wherein the target destination of the given packet is a second agent circuit of the plurality of agent circuits, wherein the second agent circuit is on the second integrated circuit and is coupled to the third segment.

10. The system as recited in claim 8 wherein the second integrated circuit is a network chip comprising a plurality of S2S network interface circuits coupled to the third segment, wherein the second S2S network interface circuit is one of the plurality of S2S network circuits.

11. The system as recited in claim 10 wherein the second S2S network interface circuit is configured to transmit the given packet to a third S2S network interface circuit on the second integrated circuit based on a third plurality of credits associated with the third segment.

12. The system as recited in claim 11 wherein the third S2S network interface circuit is coupled to a fourth segment of the plurality of segments.

13. The system as recited in claim 12 further comprising a fourth S2S network interface circuit on a third integrated circuit of the plurality of integrated circuits and couped to the fourth segment, wherein the third S2S network interface circuit is configured to transmit the given packet on the fourth segment based on a fourth plurality of credits associated with the fourth segment.

14. The system as recited in claim 1 wherein the plurality of integrated circuits includes at least two integrated circuits that include at least one different circuit relative to each other.

15. The system as recited in claim 1 wherein the plurality of integrated circuits includes two instances of a single integrated circuit.

16. An integrated circuit comprising:
    a plurality of agent circuits;
    a fabric circuit implemented entirely within the integrated circuit and configured to route packets among the plurality of agent circuits, wherein the fabric circuit corresponds to a first segment of a network that includes a plurality of segments;
    a segment-to-segment (S2S) network interface circuit configured to interface the first segment to one or more additional segments within the network;
    a die-to-die (D2D) interface circuit configured to connect the integrated circuit to another integrated circuit; and
    wherein for a given packet having a source agent circuit within the plurality of agent circuits and a destination agent circuit external to the plurality of agent circuits, the S2S network interface circuit is a target destination from the perspective of the source agent circuit.

17. The integrated circuit as recited in claim 16 further comprising a second fabric circuit implemented entirely within the integrated circuit, wherein the second fabric circuit corresponds to a second segment of the plurality of segments, and wherein the S2S network interface circuit is coupled to the second fabric circuit and is a second source agent circuit for the given packet on the second fabric circuit.

18. The integrated circuit as recited in claim 16 wherein the S2S network interface circuit is coupled to the D2D interface circuit and is configured to transmit the given packet on the D2D interface circuit to the other integrated circuit.

19. A method comprising:
- transmitting, by a first agent circuit in a first integrated circuit of a plurality of integrated circuits, a packet having a destination agent circuit in a second integrated circuit of the plurality of integrated circuits, wherein the transmitting is on a fabric circuit implemented entirely within the first integrated circuit, wherein the fabric circuit is configured to route packets among a subset of a plurality of agent circuits that are within the first integrated circuit, wherein the fabric circuit corresponds to a first segment of a network that includes a plurality of segments, and wherein the first and second integrated circuits are connected through a die-to-die interface circuit;
- receiving, by a segment-to-segment (S2S) network interface circuit within the first integrated circuit, the packet, wherein the S2S network interface circuit is configured to interface the first segment to one or more additional segments within the network, and wherein the S2S network interface circuit is a target destination of the packet from the perspective of the first agent circuit; and
- transmitting, by the S2S network interface circuit, the packet on a second segment of the plurality of segments.

20. The method as recited in claim 19 further comprising:
- receiving, by a second S2S network interface circuit on the second integrated circuit of the plurality of integrated circuits, the packet from the S2S network interface circuit; and
- transmitting, by the second S2S network interface circuit, the packet on a third segment of the plurality of segments that is implemented entirely within the second integrated circuit, wherein the destination agent circuit of the packet is coupled to the third segment.

* * * * *